United States Patent [19]

Ogawa

[11] Patent Number: 5,042,028
[45] Date of Patent: Aug. 20, 1991

[54] COMMUNICATION TERMINAL DEVICE

[75] Inventor: Fukushige Ogawa, Hino, Japan

[73] Assignee: Kabushiki Kaisha Toshiba, Kawasaki, Japan

[21] Appl. No.: 398,972

[22] Filed: Aug. 28, 1989

[30] Foreign Application Priority Data

Aug. 31, 1988 [JP] Japan .................................. 63-217244
Sep. 28, 1988 [JP] Japan .................................. 63-243698
Sep. 28, 1988 [JP] Japan .................................. 63-243699

[51] Int. Cl.$^5$ ..................... H04Q 11/04; H04M 11/06
[52] U.S. Cl. .................................. 370/58.2; 370/110.1
[58] Field of Search ............... 370/58.1, 60, 62, 110.1, 370/58.2, 58.3, 60.1

[56] References Cited

U.S. PATENT DOCUMENTS 4,512,017  4/1985  Nici et al. ........................ 370/110.1
4,620,294  10/1986  Leung et al. ........................ 370/24

FOREIGN PATENT DOCUMENTS 2919618  8/1980  Fed. Rep. of Germany .

OTHER PUBLICATIONS

IEEE Transactions on Consumer Electronics, "New Services and Technologies For Digital Telephone Sets," vol. CE31, No. 3, Aug. 1985.
Fischer, "Internationaler Fachkongre fur integrierte Telekommunikation," Telematica, Jun. 1988.
Bostonicc/89, World Prosperity Through Communications, "An ISDN Basic Access Interface VLSI and Its Applications", Sess. 40, vol. 3, Jun. 11-14, 1989.

Primary Examiner—Douglas W. Olms
Assistant Examiner—Melvin Marcelo
Attorney, Agent, or Firm—Finnegan, Henderson, Farabow, Garrett, and Dunner

[57] ABSTRACT

A communication terminal device connected to a communication network via a plurality of information channels used for transfer of information such as line switching information or packet switching information and a signal channel used for control of calling an objective communication terminal. In the device, two CODECs are provided in two corresponding information channels among information channels and analog sources such as a handset and a communication function control unit operative in a G3 facsimile mode for encoding and converting switching information, supplied from the analog sources to the information channels, to a digital signal, and decoding and converting switching information received from the information channels, to analog signals. Analog switches are provided between the analog sources and the CODECs to switch among the analog switches and these CODECs to send and receive signals to and from the analog sources and the CODECs. Thus, simultaneous communication of image information (G3 mode)/image information (G4 mode), image information (G3 mode)/voice information, and voice information/voice information is possible depending on the aspect in which the analog switches are switched.

14 Claims, 6 Drawing Sheets

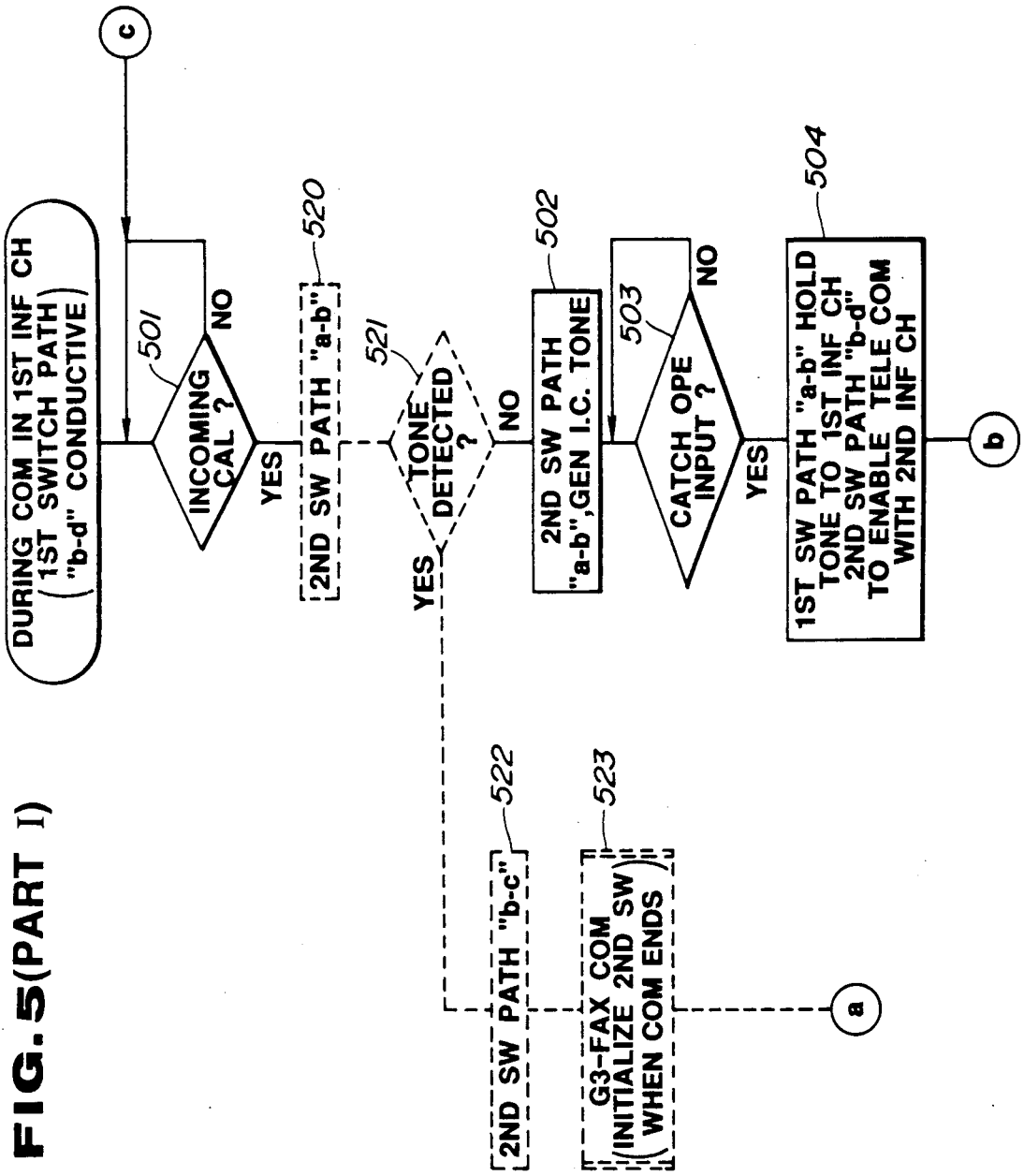
FIG.5(PART 1)

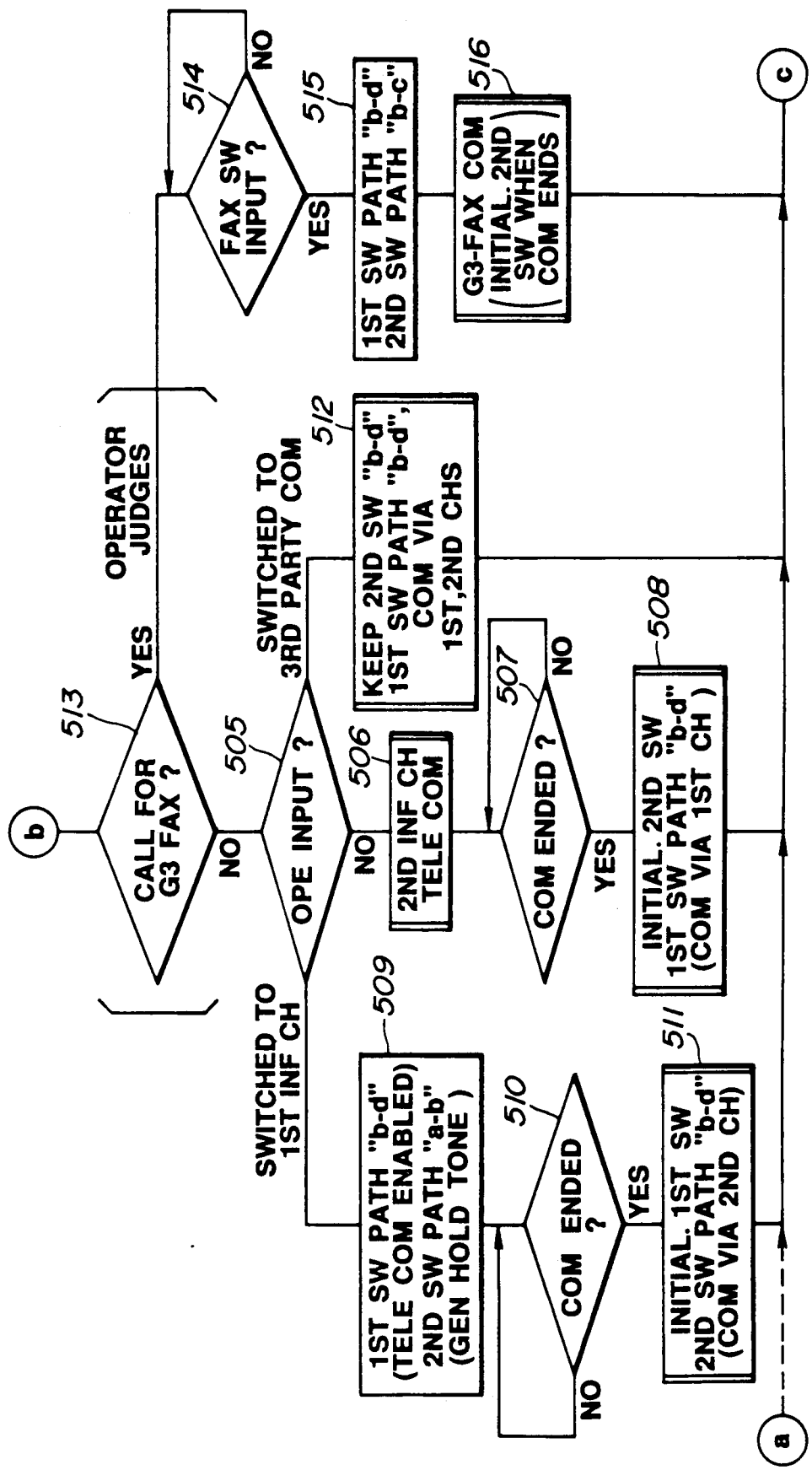
FIG.5(PART II)

COMMUNICATION TERMINAL DEVICE

BACKGROUND OF THE INVENTION

1. Field of the Invention

The present invention relates to a communication terminal device connected to a communication network via information channels used for transmission of line switching information, packet switching information or the like and a signal channel used for control of a call to an objective communication terminal, and more particularly to a communication terminal device which performs efficient communication processings using the information channels effectively in a communication network in which at least two channels are disposed as the information channels.

2. Description of the Prior Art

An information channel for transfer of switching information and a signal channel for transfer of control information may be separated in a communication network such that control information can be transmitted, for example, via the signal channel separately, at any time from voice information or image information as switching information, or such that a plurality of information channels can be controlled via a single signal channel to provide various services different in nature such as telephone, telex or facsmile synthetically and efficiently. One such network is known conventionally as ISDN (Integrated Services Digital Network).

In ISDN, the information channels and the signal channels are called B- and D-channels, respectively. Especially in the D-channel, identification information on a caller's communication terminal is transmitted additionally as the control information. Therefore, in the called communication terminal, it can be known, in accordance with the identification information on the caller's communication terminal transmitted via the D-channel, which of the communication terminals has transmitted the information (voice information and image information) in the B-channel.

In ISDN, a plurality of channels is provided as information channels (B-channels) in order to controllably handle various services different in nature such as telephone, telex and facsimile. Thus, the transmission of information is possible in the form of simultaneous transmission of voice information and image information using two empty information channels.

More specifically, if there is an incoming telephone call in a first information channel during communication of image information in a G4 facsimile mode in a second information channel, simultaneous communication of image and voice is selected to continue the operation between the appropriate communication terminal device.

According to such ISDN, it is true that the above various services can be realized synthetically and efficiently, and also simultaneous communication of image and voice is possible, as mentioned above, but, for example, the existing facsimile device connected to the ISDN is limited in use to the communication of image information in the G4 facsimile mode and voice information on regular telephone communication although simultaneous communication of image and voice is possible, so that the efficient use of the whole communication network is not necessarily achieved.

For example, the following requirements are essential for realizing a very significant form of use in order to improve the user interface as the communication terminal device or in order to improve the communication efficiency of the whole communication network:

(a) When there is an originating telephone call in the second information channel during the communication of image information in the G4 facsimile mode in the first information channel, the originating telephone call relating to a request for receipt of image information in the G3 facsimile mode, the call should be received;

(b) When there is an originating telephone call in the second information channel during telephone communication in the first information channel, the originating telephone call relating to a request for receipt of image information in the G3 facsimile mode, the call should be received;

(c) When there is an originating telephone call in the second information channel during telephone communication in the first information channel, the call relating to a request for telephone communication, the call should be received; and (d) When there is an originating telephone call in the second information channel during telephone communication in the first information channel, the call relating to a request for telephone communication, the call should be recorded by an automatic answering system.

However, some existing communication terminal devices cannot virtually realize these requirements in whatever manner they are connected to the ISDN.

SUMMARY OF THE INVENTION

It is therefore an object of the present invention to provide a communication terminal device which is excellent in the user interface, and greatly improves the communication efficiency on the basis of the efficient use of at least two information channels for transferring of switching information in a communication network which also has a signal channel for transferring of control information.

It is a specific object of the present invention to provide a communication terminal device which is capable of properly realizing simultaneous communication of image information in the G4 and G3 facsimile modes, simultaneous communication of voice information and image information in the G3 facsimile mode, and simultaneous communication of two kinds of voice information.

In order to achieve such object, according to the present invention, two CODECs are provided in any corresponding information channels between analog sources such as a handset and a communication function control unit operative in a G3 facsimile mode and the information channels to encode the switching information sent from an analog source to an information channel to a digital signal and to decode the switching information received from an information channel to an analog signal. Analog switches are provided between the analog sources and the CODECs and switched so as to transmit and receive signals to and from desired ones of the analog sources and the CODECs.

By such arrangement, the following operations are easily realized depending on the aspects in which the analog switches are switched;

(a) When there is an originating telephone call in the second information channel during the communication of image information in the G4 facsimile mode in the first information channel, the originating telephone call relating to a request for receipt of image information in the G3 facsimile mode, the call should be received (The signal path between the CODEC corresponding to the second information channel and the communication function control unit in the G3 facsimile mode is conducted.);

(b) When there is an originating telephone call in the second information channel during telephone communication in the first information channel, the originating telephone call relating to a request for receipt of image information in the G3 facsimile mode, the call should be received (The signal path between the handset and the CODEC corresponding to the first information channel is maintained while the signal path between the CODEC corresponding to the second information channel and the communication function control unit in the G3 facsimile mode is connected.);

(c) When there is an originating telephone call in the second information channel during telephone communication in the first information channel, the call relating to a request for telephone communication, the call should be received (The connection between the handset and the CODEC corresponding to the first information channel is temporarily released and the signal path between the handset and the CODEC corresponding to the second information channel is connected.); and (d) When there is an originating telephone call in the second information channel during telephone communication in the first information channel, the call relating to a request for telephone communication, the call should be recorded by an automatic answering system (The connection between the handset and the CODEC corresponding to the first information channel is maintained while the signal path between the automatic answering function unit and the CODEC corresponding to the second information channel is connected.).

BRIEF DESCRIPTION OF THE DRAWINGS

FIGS. 5 and 6 are (Part I and Part II) each a flowchart showing the simultaneous processing performed by the communication terminal device of FIG. 1 when there is an incoming telephone call.

DESCRIPTION OF THE PREFERRED EMBODIMENT

Figure 1:
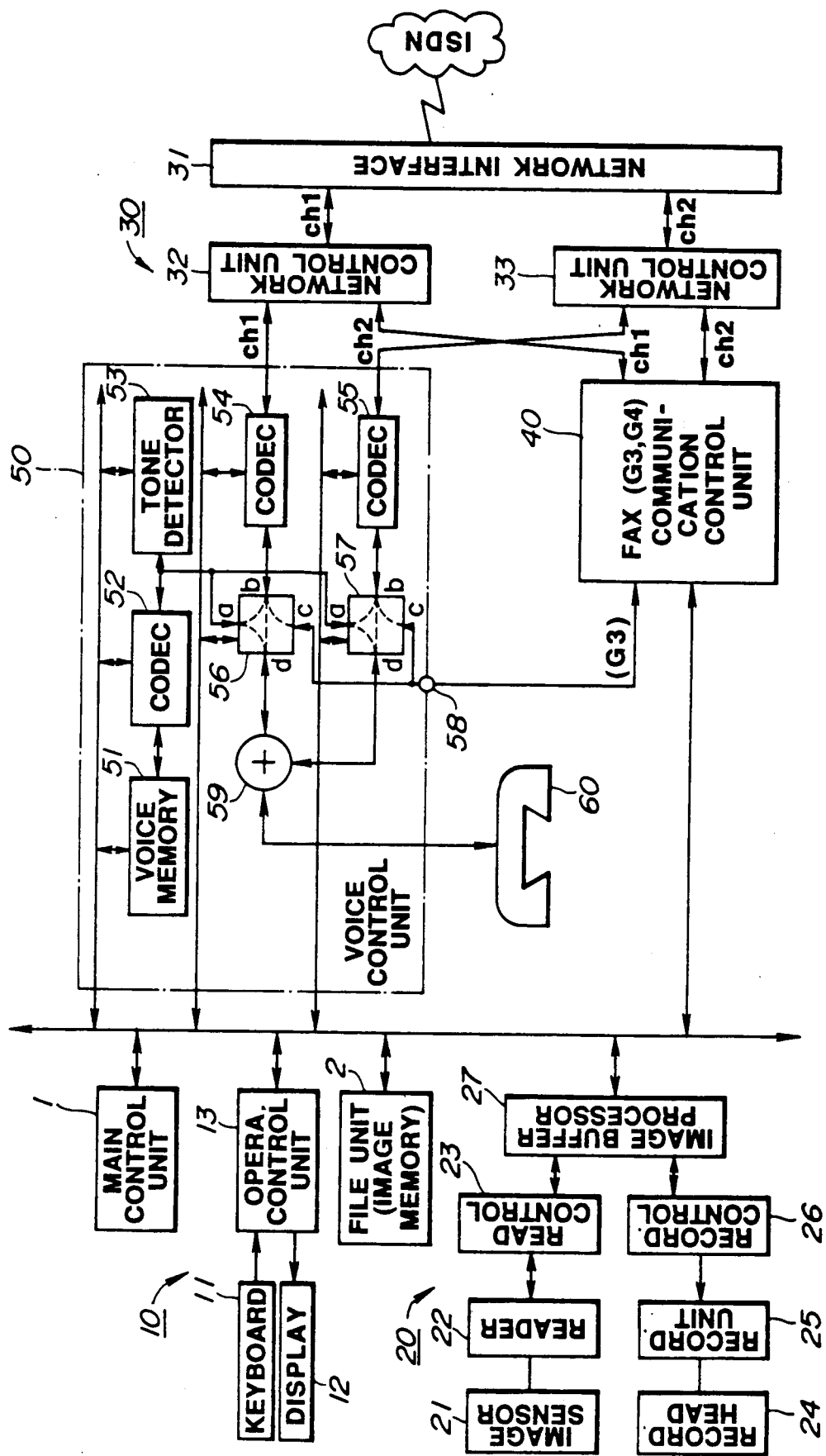
FIG. 1 is a block diagram of one embodiment of a communication terminal device according to the present invention.

FIG. 1 illustrates one embodiment of a communication terminal device according to the present invention. In the particular embodiment, for convenience, the ISDN, mentioned above, will be considered as the communication network and a facsimile device will be considered as the communication terminal device.

As shown in FIG. 1, the device of the first embodiment mainly includes a main control unit 1 which systematically controls the whole device, a file unit (an image memory) 2 in which image data is temporarily stored as needed, an operation section 10 which transmits and receives data to and from the user (operator), an image processor 20 which performs image processings such as image reading and recording as a facsimile unit, a network communication unit 30 which performs communication (call) processings on an outgoing and an incoming call between the particular device and the ISDN, a FAX communication control unit 40 which realizes a communication control function in accordance with facsimile processes in so-called G3 and G4 modes, a voice control unit 50 which realizes the communication control function in accordance with predetermined processes given by so-called telephone line information mainly including voice information and which realizes the simultaneous communication of two kinds of information in various forms to be described later in more detail as the particular device, and a handset 60 connected to the voice control unit 50 for transmitting and receiving direct voice information to and from the operator.

The structure and function of these elements will now be described in more detail. The operation section 10 includes a keyboard 11 which performs a call originating operation and other keying-in operations, a display 12 which visually displays information on operation guides and other necessary information, an operation control unit 13 which transmits the information keyed in at the keyboard 11 to the main control unit 1, and displays on the display 12 the information from the keyboard 11 and commands on display from the main control unit 1. The regular call origination by the operator is performed through the operation section 10 (the main control unit 1 recognizes the originating call and starts the FAX communication control unit 40 or voice control unit 50). The number of the terminal which has brought about the incoming call is also displayed and reported to the operator via the operation section 10.

The image processor 20 includes a reader 22 which reads an image in an original document received via an image sensor 21 such as a CCD, a reader control unit 23 which properly controls the reading of the image by the reader 22 and converts the read image into a binary image signal, a recording unit 25 which records on paper an image corresponding to the image signal (binary signal) via a recording head 24 such as a thermal head, a recording control unit 26 which supplies the image signal to the recording unit 25 and properly controls the recording operation of the recording unit 25, and an image buffer 27 which buffers the image signal received from the reader control unit 23 while transferring the buffered image signal to the FAX communication control unit 40, or buffers the image data received from the FAX communication control unit 40 while supplying the buffered information to the recording control unit 26, in accordance with commands from the main control unit 1. The image processor 20 performs well-known image reading and image recording operations as the facsimile device.

The network communication unit 30 includes a network interface 31 connected to an ISDN via the B- and D-channels (not shown), and a first and a second network control units 32 and 33 connected to the network interface 31 to separately perform operations for originating and receiving calls mainly to and from the ISDN. The first network control unit 32 performs the above call processes in a first channel (hereinafter referred to as a first information channel) ch1 of the B-channels (information channels) while the second network control unit 33 performs the above call processes in a second channel (hereinafter referred to as a second information channel) ch2 of the B channels.

The voice control unit 50 includes a voice memory 51 which has an area in which an incoming tone signal produced when there is an incoming telephone call, a holding tone produced when telephone communication is held, and a voice message which informs the caller of the possible use of an automatic answering function are stored beforehand as digital voice information. An area in which the voice information received from the caller is recorded as digital voice information when an automatic answering function is used, one of these voice information segments being selectively read or written from or in the memory 51, in accordance with each command from the main control unit 1, a voice CODEC 52 which converts (decodes) the voice information (digital signal) read out from the voice memory 51 to an analog signal, and converts (decodes) voice information (an analog signal) written in the voice memory 51 to a digital signal, a tone detector 53 which detects an incoming tone (tone signal) indicative of a request for receipt of image data in a G3 facsimile mode, a first PCM CODEC 54 provided in the first information channel ch1 for converting (decoding) a digital signal (PCM signal) received via the first information channel ch1 to an analog signal and supplies it to the voice control unit 50, converts (encodes) an analog signal, transmitted from the voice control unit 50 to the first information channel ch1, to a digital signal (PCM signal) and outputting the resulting signal, a second PCM CODEC 55 disposed in the second information channel ch2 for converting (decoding) the digital signal (PCM signal) received via the second information channel ch2 to an analog signal and storing it in the voice control unit 50, converting (decoding) the analog signal, supplied from the voice control unit 50 to the second information channel ch2, to a digital signal (PCM signal) and outputting the digital signal, a first and a second analog switch 56 and 57 disposed among the first and second PCM CODECs 54 and 55 and analog sources (analog signal inputting/outputting units such as the voice memory 51 via the voice CODEC 52, tone detector 53, the G3 facsimile mode communication function unit in the FAX communication control unit 40 and handset 60 for switching the conductive states among four terminals a, b, c and d, a G3-interface 58 between the voice control unit 50 and the G3 facsimile mode communication function unit in the FAX communication control unit 40, and an adder 59 disposed, as shown, between the respective first and second analog switches 56 and 57 and handset 60 for adding analog voice information signals.

The respective terminals a of the first and second analog switches 56 and 57 are connected in common to the analog input/output terminal of the voice CODEC 52 and to a tone signal detection terminal of the tone detector 53, the respective terminals b of the analog switches 56 and 57 are connected to the analog input/output terminals of the corresponding PCM CODECs, the respective terminals c of the analog switches 56 and 57 are connected in common to the G3 interface 58, and the respective terminals d are connected to one input/output terminal of the adders 59.

The first and second analog switches 56 and 57 are controlled independently so that the simultaneous communication of two kinds of information is realized in several forms, which are conventionally considered to be impossible, in accordance with the respective switched states of the analog switches.

FIGS. 2-6 illustrate the various operations of the communication terminal device of the particular embodiment, mainly the operations of the main control unit 1, and the respective operational mechanisms of the communication terminal device will be described in detail with reference to FIGS. 2-6 together.

Figure 2:
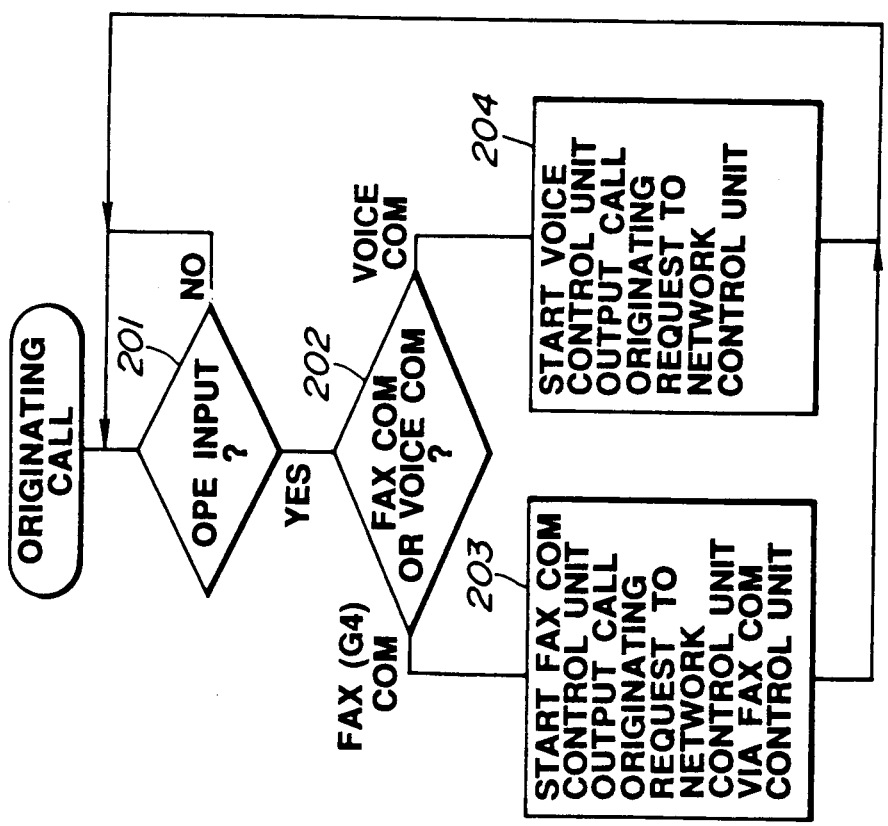

The operation of the communication terminal device related to general outgoing and incoming calls in the case of facsimile (FAX) communication and regular voice communication (telephone communication) will be described. Call origination is performed by the call originating operation of the main control unit 1 illustrated in FIG. 2. Assume now that the operator performs a predetermined calling operation to any particular subscriber through the keyboard 11 of the operation unit 10 in accordance with appropriate guides for operation displayed on the display 12 of the operation unit 10. The communication terminal device starts the processings, recited below, in accordance with the recognition of the calling operation by the main control unit 1 (step 201 of FIG. 2):

(1) When the main control unit 1 recognizes the calling operation in accordance with a report on the keyboard operation from the operation control unit 13, it determines whether the calling operation requires facsimile (FAX) communication via the operation control unit 13 or voice communication (telephone communication) (step 202 of FIG. 2);

(2) As a result, if the main control unit 1 determines that the calling operation requires FAX communication, it starts the FAX communication control unit 40 and outputs a call request to the network control unit 32 or 33 via the FAX communication control unit 40 (step 203 of FIG. 2). In accordance with the call request, the network control unit 32 or 33 performs a predetermined calling process via the network interface 31 to a desired objective terminal. Thereafter, the main control unit 1 starts the image processor 20 (reader 22) on condition that the communication enable state is brought about by the execution of the calling process to start transmission of the image data via an empty information channel;

(3) As the result of the determination (step 202 of FIG. 2), if the main control unit determines that the calling operation requires voice communication (telephone communication), it starts the voice control unit 50, and outputs a calling request via the voice control unit 50 to the network control unit 32 or 33 (step 204 of FIG. 2). In accordance with this calling request, the network control unit 32 or 33 performs a predetermined calling process via the network interface 31 to the desired objective terminal. Thereafter, the main control unit 1 controls the analog switches 56 and 57 so as to render conductive the path between the terminals b and d of a switch corresponding to an empty information channel, and logically connects the handset 60 to the empty information channel. By the above processing by the main control unit 1, FAX communication or voice communication (telephone communication) is started. Simultaneous communication of image data/voice data is possible via two empty information channels in the case of the facsimile communication (in a G4 mode) and regular voice communication considered.

Figure 3:
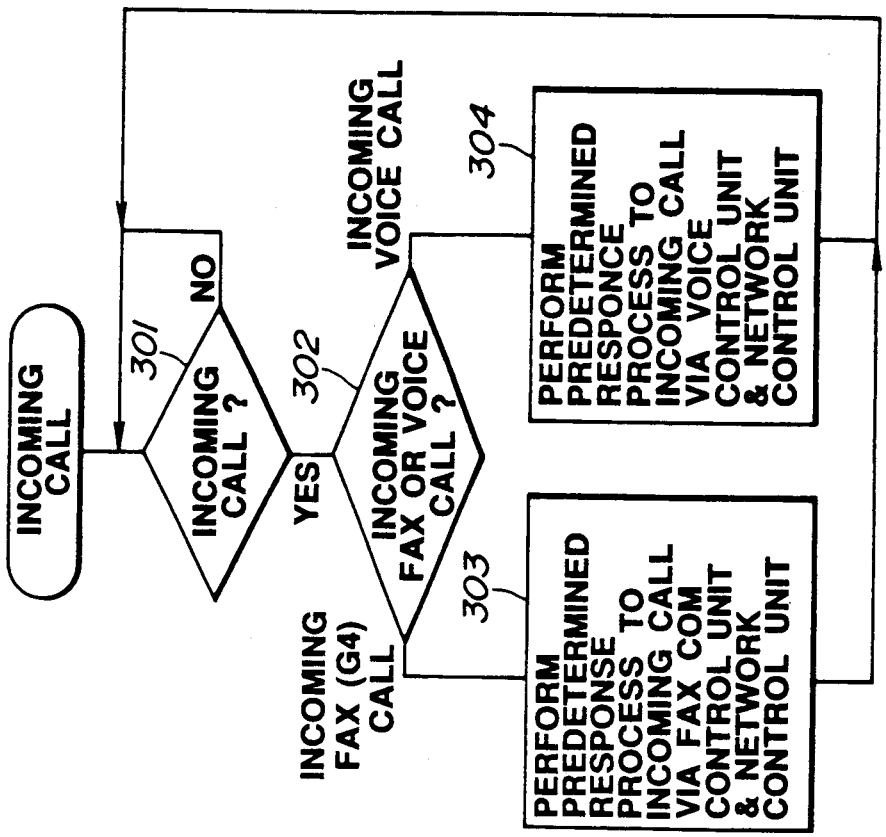
FIG. 2 and FIG. 3 show a flowchart illustrating the operation of the communication terminal device, according to the present invention, performed when there is an originating call.

The incoming call operation is performed by the main control unit 1 as illustrated in FIG. 3. Assume now that a call is originated for requesting communication (facsimile communication or regular voice communication) to the communication terminal device of FIG. 1 by another communication terminal (a facsimile unit, not shown) connected to the ISDN. The communication terminal which has originated the call first sends to the ISDN a signal to call the communication terminal device of the particular embodiment. The call signal usually includes data indicative of the subscriber number allocated beforehand to the caller.

The call signal sent to the ISDN is received as an incoming signal by the network control units 32 or 33 in the communication terminal device via the ISDN circuit (D-channel) and the network interface 31. When the network control unit 32 or 33 receives the incoming signal, the communication terminal device starts to perform processings recited below in accordance with the recognition of the incoming signal by the main control unit 1 (step 301 of FIG. 3):

(1) When the main control unit 1 recognizes the incoming call in accordance with a report on the incoming call from the network control unit 32 or 33, it determines whether the incoming call signal requires FAX communication or voice communication (telephone communication) via the network control unit 32 or 33 (step 302 of FIG. 3);

(2) As a result, if the main control unit 1 determines that the incoming signal requires FAX communication, it performs a predetermined incoming signal response process via the FAX communication control unit 40 and network control unit 32 or 33 (step 303 of FIG. 3). Thereafter, the main control unit 1 starts the image processor 20 (recording unit 25) to receive image data on condition that communication enable state is brought about by the execution of the incoming signal response process. The image data received and subsequent to the incoming call signal is supplied to the network control units 32 or 33 via an empty information channel, appropriately demodulated via the FAX communication control unit 40, transferred to the image buffer processor 37, and recorded on recording paper via the recording unit 35; and (3) As the result of the determination (step 302 of FIG. 3), if the main control unit 1 determines that the incoming call signal requires voice communication (telephone communication), it performs a predetermined incoming signal response process via the voice control unit 50 and network control units 32 or 33 (step 304 of FIG. 3). Thereafter, the main control unit 1 controls the analog switches 56 or 57 so as to render conductive the path between the terminals b and d of the switches 56 or 57 corresponding to an empty information channel on condition that the communication enable state is brought about by the execution of the incoming call response process to thereby connect the handset 60 logically to the empty information channel.

By the above operation of the main control unit 1, a separate processing is performed whether it is directed to FAX communication or to voice communication (telephone communication). Also in this case, simultaneous communication of image data and voice data is possible through two empty information channels in the facsimile communication (in the G4 mode) and regular voice communication considered here.

As a specific example of the operation of the device meeting the actual situation, various operations of the device performed, for example, when there is a request for an originating call or an incoming call in the second information channel during G4 facsimile communication through the first information channel, will be described with reference to FIG. 4.

Figure 4:
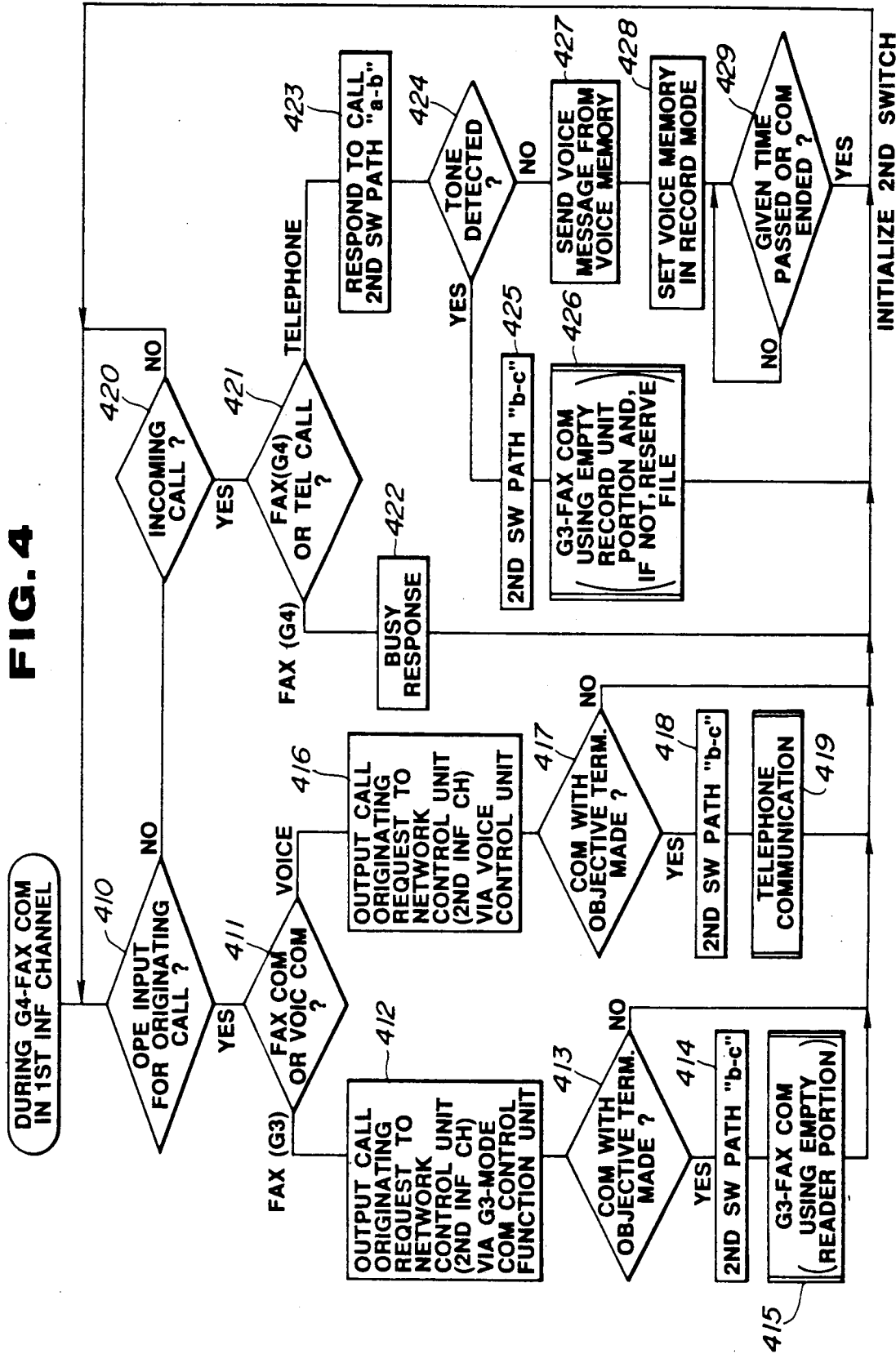
FIG. 4 is a flowchart illustrating the simultaneous processings performed by the communication terminal device of FIG. 1 when there is an originating call or an incoming call during G4 facsimile communication.

Assume now that when G4 facsimile communication is being performed through the first information channel, the operator performs the predetermined calling operation to any particular subscriber. The device starts the following processing in accordance with the recognition of the calling operation by the main control unit 1 (step 410 of FIG. 4):

(1) When the main control unit 1 recognizes the calling operation in accordance with a report on the keyboard operation from the operation control unit 13, it determines whether the calling operation requires FAX communication in the G3 mode or voice communication (telephone communication) through the operation control unit 13 (step 411 of FIG. 4);

(2) As a result, if the control unit 1 determines that the calling operation requires FAX communication in the G3 mode, it starts the G3 mode communication control function part of the FAX communication control unit 40 and outputs a calling request to the network control unit 33 through the G3 mode communication control function part (step 412 of FIG. 4). Thus, the network control unit 33 performs a predetermined calling process to the desired objective subscriber through the network interface 31, as mentioned above;

(3) Thereafter, the main control unit 1 sets the second analog switch 57 corresponding to the second information channel ch2 in the voice control unit 50 so as to render conductive the path between the terminals b and c of the second analog switch 57 (step 41 of FIG. 4) and starts a predetermined FAX communication processing in the G3 mode through the image processor 20, FAX communication control unit 40, G3 interface 58, second analog switch 57, second PCM CODEC 55, and second network control unit 33 (step 415 of FIG. 4). The image processing in that case is performed using the portion of the image processor 20 other than its portion used in the G4 mode (for example, using the reader 22 if the facsimile communication in the G4 mode performed now involves recording (receive) image data). Of course, it is not performed, so if desired, tranmitted image data is stored beforehand in the file section (image memory) 2 in the G3 mode. In that case, simultaneous communication in the G4/G3 modes is possible irrespective of how the image processor 20 is used. If communication enable state is not brought out for the convenience of the objective subscriber although the calling process is performed (step 413 of FIG. 4), the main control unit 1 shifts to a standby state for a new originating call or an incoming call;

(4) As the result of the determination (1) (step 411 of FIG. 4), if the main control unit determines that the calling operation requires voice communication (telephone communication), it starts the voice control unit 50 to output an originating call request to the network control unit 33 through the voice control unit 50 (step 416 of FIG. 4). Thus, the network control unit 33 performs a desired calling process to the desired objective subscriber through the network interface 31, as mentioned above; and (5) Thereafter, the main control unit 1 sets the second analog switch 57 corresponding to the second information channel ch2 in the voice control unit 50 so as to render conductive the path between the terminals b and d of the switch 57 (step 418 of FIG. 4) to thereby enable communication through the handset 60, adder 59, second analog switch 57, second PCM CODEC 55 and second network control unit 33 (step 411 of FIG. 4). If the communication enable state is not brought about for the convenience of the objective subscriber even by the execution of the calling process (step 417 of FIG. 4), the main control unit 1 shifts to a standby state for a new originating call or a new incoming call.

Similarly, if the incoming call signal mentioned above is received at the network control unit 33 when G4 facsimile communication is being performed in the first information channel, the communication terminal device performs the following processings in accordance with the recognition of the incoming call by the main control unit 1 (step 420 of FIG. 4):

(1) When the main control unit 1 recognizes the incoming call in accordance with a report on the incoming call from the network control unit 33, it determines whether the incoming call signal is directed to facsimile (FAX) in a G4 mode or an incoming telephone call (step 421 of FIG. 4);

(2) As a result, if the main control unit 1 determines that the incoming call signal is directed to an incoming facsimile (G4 mode) call, it makes a BUSY response to the caller through the FAX communication control unit 40 and network control unit 33 (step 422 of FIG. 4) and shifts to a standby state for a new originating call or an incoming call;

(3) As the result of the determination (step 421 of FIG. 4), if the main control unit determines that the incoming call signal is directed to an incoming telephone call, it makes a predetermined response to the incoming call through the voice control unit 50 and network control unit 33, and sets the second analog switch 57 corresponding to the second information channel ch2 in the voice control unit 50 so as to render conductive the path between the terminals a and b of the analog switch 57 (step 423 of FIG. 4) to logically connect the tone detector 53 to the second information channel (second PCM CODEC 55) which has received the incoming call and to determine whether the tone signal has been received (step 424 of FIG. 4);

(4) As a result, if the main control unit 1 determines that the tone signal has been received, namely, that the incoming telephone call is a request for facsimile receipt in the G3 mode, it sets the second analog switch 57 so as to render conductive the path between the terminals b and c (step 425 of FIG. 4) of the switch 57, and starts a predetermined FAX communication (receipt) in the G3 mode through the second network control unit 33, second PCM CODEC 55, second analog switch 57, G3-interface 58, FAX communication control unit 40 and image processor 20 (step 426 of FIG. 4). The image processing in that case is performed through the portion of the image processor 20 other than its portion used in the G4 mode (for example, through the recording unit 25 if the facsimile communication which is being performed in the G4 mode is directed to reading (transmission) of image data). Of course, in this case, received image data may be stored in the file unit (image-memory) 2 even if there are no empty locations in the image processor 20. At any event, simultaneous facsimile communication in the G4 mode/G3 mode is possible by such operation of the communication terminal device of the particular embodiment;

(5) As the result of the determination (step 424 of FIG. 4), if the main control unit 1 determines that no tone signal is received, namely, that the incoming telephone call is a request for telephone communication, it maintains the second analog switch 57 so as to render conductive the path between the terminals a and b of the switch 57 to operate the automatic answering telephone function, for example, while reading a voice message from the voice memory 51 and transmitting it to the objective subscriber (step 427 of FIG. 4); and (6) When the automatic answering telephone function is thus operated, the main control unit 1 sets the voice memory 5 in the recording mode (step 428 of FIG. 4). It releases the recording mode and shifts to a standby state for a new originating call or a new incoming call after a lapse of a predetermined time during which a message (voice data) from the objective communication terminal is sufficiently recorded or if the objective terminal has performed an operation of breaking the communication state such as an off-hook operation (step 429 of FIG. 4).

Thus, even if facsimile communication is being performed in a G4 mode in one information channel, another facsimile communication or telephone communication can be performed in a G3 mode using another empty information channel.

While it is illustrated that the automatic answering telephone function is operated as shown in the items (5) and (6) if there is an incoming telephone call to request a telephone call in the example of FIG. 4, the operation of the communication terminal device may be changed to the followings:

(5') When no tone signal is detected, the main control unit reads data on the incoming call tone and outputs it to the handset 60 to thereby require the operator to perform an off-hook operation; and (6') If the handset goes off-hook, the main control unit 1 sets the second analog switch 57 so as to render conductive the path between the terminals b and d of the switch 57 to thereby enable telephone communication.

The operation of the communication terminal device performed when there is an incoming telephone call through the second information channel during telephone communication in the first information channel will now be described as another specific example. FIG. 5 illustrates the operation of the communication terminal device performed for positively catching an incoming telephone call, if any, without rejecting it if the telephone call is directed to a request for telephone communication. First, various operations of the communication terminal device directed mainly to that catching operation and performed during telephone communication in the first information channel will now be described in detail with reference to FIG. 5. If the incoming call signal is received by the network control unit 33 during telephone communication in the first information channel, the communication terminal device starts the operations recited below in accordance with the recognition of the incoming signal by the main control unit 1 (step 501 of FIG. 5):

(1) When the main control unit 1 recognizes the incoming signal in accordance with a report on the incoming signal from the network control unit 33, it responds to the incoming signal in a predetermined manner through the voice control unit 50 and network control unit 33, then sets the second analog switch 57 corresponding to the second information channel ch2 in the voice control unit 50 so as to render conductive the path between the terminals a and d of the switch 57, reads data on the incoming signal tone from the voice memory 51, outputs it to the handset 60 and requires the operator, who is making a telephone call through the handset 60, to perform an operation about whether he will receive the new incoming signal or not (step 502 of FIG. 5);

(2) If there is a keying-in operation by the operator through the operation unit 10 to the effect that he will receive the new incoming call or perform the catching operation (step 503 of FIG. 5), the main control unit 1 recognizes it and sets the first analog switch 56 in which the path between the terminals b and d of the switch 56 is conductive in a state in which the path between the terminals a and b of the switch is conductive, then reads data on the holding tone from the voice memory 51 and sends it to the objective communication terminal which is put in the telephone communication through the voice CODEC 52, first analog switch 56, first PCM CODEC 54, and first network control unit 32, sets the second analog switch 57 in which the path between the terminals a and b of the switch 57 is conductive in another state in which the path between the terminals b and d of the switch 57 is conductive to thereby enable telephone communication with a terminal which has brought about the new incoming call in the second information channel (step 504 of FIG. 5);

(3) Thereafter, so long as there is no operation input by the operator (step 505 of FIG. 5), the main control unit 1 maintains its telephone communication through the second information channel (step 506 of FIG. 5), and initializes the second analog switch 57 (for example, such that no conduction is established between any two of four terminals) and switches again the first analog switch 56 to a state in which the path between terminals b and d of the switch 56 is conductive if the telephone communication is terminated (step 507 of FIG. 5) to recover telephone communication through the first information channel (step 508 of FIG. 5);

(4) Assume that after a telephone communication with the caller from which there has been the new incoming call in the second information channel which is enabled (step 504 of FIG. 5), the operator has performed the input operation through the operation unit 10 to again select the communication terminal in the first information channel (step 505 of FIG. 5). The main control unit 1 sets the first analog switch 56 so as to render conductive the path between the terminals b and d of the switch 56 to return to the communication through the first information channel, and the second analog switch 57 so as to render conductive the path between the terminals a and b of the switch 57, sends the data on the holding tone read from the voice memory 51 through the CODEC 52, second analog switch 57, second PCM CODEC 55 and second network control unit 33 to the communication terminal in the second information channel (step 509 of FIG. 5), initializes the first analog switch 56 when the communication through the first information channel is terminated (step 510 of FIG. 5), again sets the second analog switch 57 so as to render conductive the path between the terminals b and d of the switch 57 to thereby recover telephone communication through the second information channel (step 511 of FIG. 5); and (5) Assume that after a telephone communication with the caller from which there was the new incoming call in the second information channel which is enabled (step 504 of FIG. 5), the operator has performed an input operation through the operation unit 10 to select a third-party telephone communication (step 505 of FIG. 5). At this time, the main control unit 1 maintains the second analog switch 57 in the state in which the path between the terminals b and d of the switch 57 is conductive, and sets the first analog switch 56 so as to render conductive the path between the terminals b and d of the switch 56 to enable a third-party telephone communication through the adder 59 with the objective subscribers in the second information channel and in the first information channel (step 512 of FIG. 5).

When telephone communication with the caller from which there was the new incoming call in the second information channel is enabled (step 504 of FIG. 5), and if the incoming telephone call requests facsimile receipt in the G3 mode, the operator recognizes a tone signal indicative of the request for facsimile receipt. In that case, the operator determines that the new incoming telephone call is directed to a request for facsimile receipt in the G3 mode (step 513 of FIG. 5) and performs an input operation through the operation unit 10 to the effect that facsimile receipt in the G3 mode is allowable.

When such input operation is performed, the communication terminal device of the particular embodiment further performs the following processings in accordance with the recognition of the input operation by the main control unit 1 (step 514 of FIG. 5):

(6) When the main control unit 1 recognizes the input operation that facsimile receipt in the G3 mode is allowable, it switches the first analog switch 56 again such that conduction is established between its terminals b and d to return the first information channel to a telephone communication state, controls the second analog switch 57 so as to render conductive the path between the terminals b and c (step 515 of FIG. 5), and starts a predetermined FAX communication (reception) in the G3 mode through the second network control unit 33, second PCM CODEC 55, second analog switch 57, G3-interface 58, FAX communication control unit 40 and image processor 20 (step 516 of FIG. 5).

According to the above operation of the communication terminal device, even if one information channel is used for telephone communication, catching the caller from which there was the new incoming call in an empty information channel and facsimile communication in the G3 mode through another empty information channel can be performed simultaneously.

A request for facsimile receipt in the G3 mode can be performed in the manner shown by the broken line in FIG. 5, using the tone detector 53. In this case, if the incoming call signal is received in the network control unit 33, the communication terminal device starts processings described below in accordance with the recognition of the incoming call by the main control unit 1 (step 501 of FIG. 5):

(7) When the main control unit 1 recognizes the incoming call in accordance with a report on the incoming call from the network control unit 33, it makes a predetermined response to the incoming call through the voice control unit 50 and network control unit 33, controls the second analog switch 57 corresponding to the second information channel ch2 in the voice control unit 50 so as to render conductive the path between the terminals a and b (step 520 of FIG. 5) of the switch 57 to logically connect the tone detector 53 to the second information channel (the second PCM CODEC 55) in which there was the incoming call, and determines whether the tone signal is received (step 521 of FIG. 5).

(8) As a result, if the main control unit determines that the tone signal is received, namely, that the incoming telephone call is a request for a facsimile receipt in the G3 mode, it controls the second analog switch 57 so as to render conductive the path between the terminals b and c (step 522 of FIG. 5) of the switch 57, and starts a predetermined FAX communication (receipt) in the G3 mode through the second network control unit 33, second PCM CODEC 55, second analog switch 57, G3-interface 58, FAX communication control unit 40 and image processor 20 (step 523 of FIG. 5).

Also by the above processing, simultaneous communication of telephone communication and G3 mode facsimile is possible. In this case, if no receipt of the tone signal is recognized in the step of 521 of FIG. 5, control shifts to the processing (1) (step 502 of FIG. 5).

If the new incoming call in the empty information channel is a request for facsimile communication in the G4 mode, the simultaneous communication of telephone communication and G4 mode facsimile is achieved as mentioned above with no problems.

Figure 6:
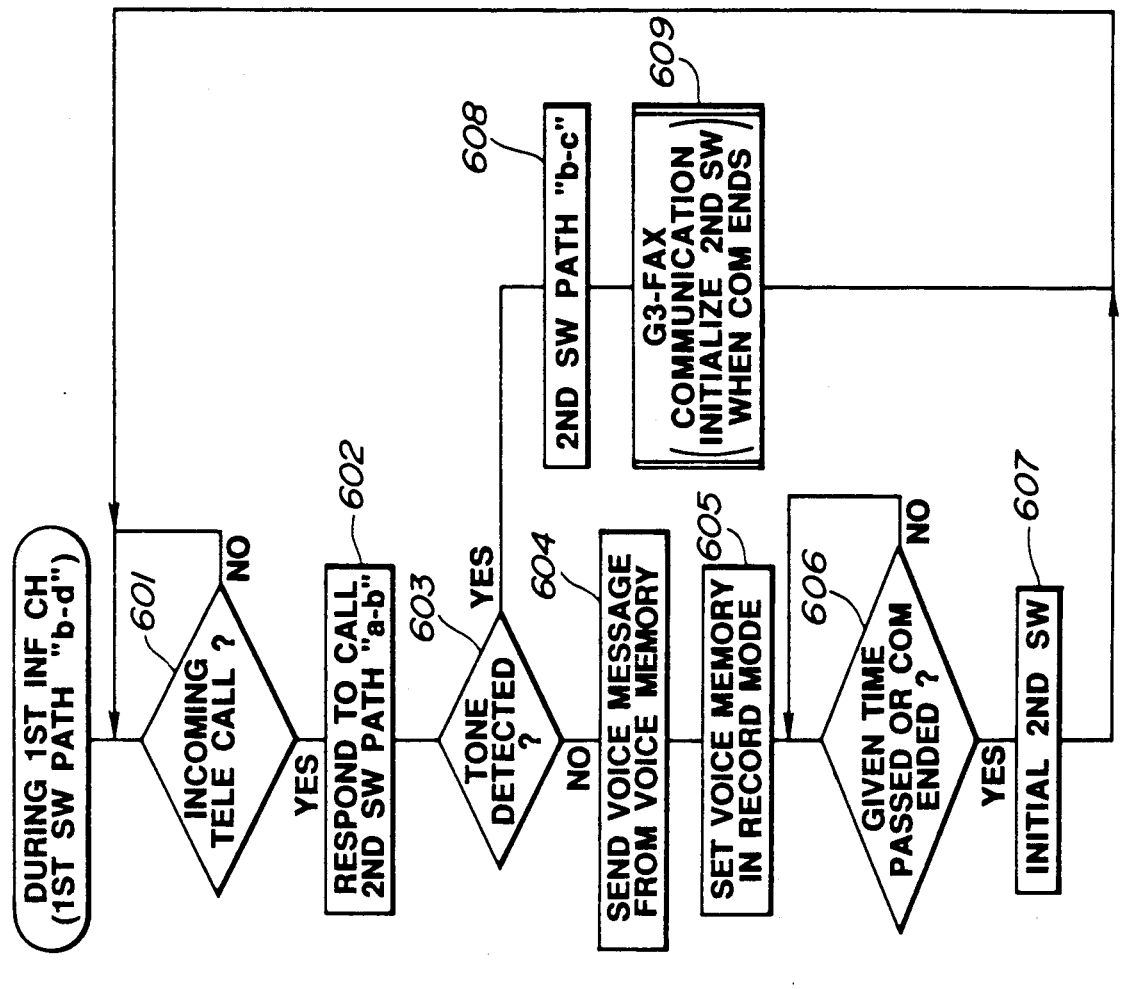

FIG. 6 mainly illustrates the operation of the automatic answering telephone function which includes automatically recording voice information from a caller on an incoming call requesting a telephone communication and received through the second information channel during telephone communication in the first information channel. Finally, various operations of the communication terminal device directed mainly to the automatic answering telephone function and performed during telephone communication in the first information channel will be described in detail with reference to FIG. 6. If the incoming call signal is received in the network control unit 33 during telephone communication in the first information channel, the communication terminal device of the particular embodiment starts its processing in the aspects recited below in accordance with the recognition of the incoming call by the main control unit 1 (step 601 of FIG. 6):

(1) When the main control unit 1 recognizes that there was the incoming call in accordance with a report on the incoming call from the network control unit 33, it makes a predetermined response to the incoming call through the voice control unit 50 and network control unit 33, controls the second analog switch 57 corresponding to the second information channel ch2 in the voice control unit 50 so as to render conductive the path between the terminals a and b of the switch 57 (step 602 of FIG. 6) to logically connect the tone detector 53 to the second information channel (second PCM CODEC 55) in which the incoming call is received and to determine whether the tone signal is received (step 603 of FIG. 6);

(2) As a result, if the main control unit determines that no tone signal is received, namely, that the incoming telephone call is a request for telephone communication, the main control unit 1 maintains the second analog switch 57 in a state in which the path between the terminals a and b of the switch is conductive while reading the voice message from the memory 51 and sends it to the objective communication terminal (step 604 of FIG. 6);

(3) The main control unit 1 then sets the voice memory 51 in a recording mode (step 605 of FIG. 6). After a lapse of a predetermined time in which the message (voice data) from the objective communication terminal is recorded sufficiently, or if the objective communication terminal has terminated the communication by performing an on-hook operation (step 606 of FIG. 6), the main control unit 1 releases the recording mode, initializes the second analog switch 57 (step 607 of FIG. 6) and shifts to a standby state for a new originating call or a new incoming call; and (4) If the main control unit determines that the tone signal is received, namely, that the incoming telephone call is a request for facsimile receipt in the G3 mode as the result of the determination about whether the tone signal is received (step 603 of FIG. 6), the main control unit 1 controls the second analog switch 57 so as to render conductive the path between the terminals b and c of the switch (step 608 of FIG. 6), and starts a predetermined FAX communication (receipt) in the G3 mode through the second network control unit 33, second PCM CODEC 55, second analog switch 57, G3-interface 58, FAX communication control unit 40 and image processor 20 (step 609 of FIG. 6). Also in that case, after such communication processing is terminated, the second analog switch 57 is initialized to bring about a standby state for a new originating call or a new incoming call.

According to the above operation of the communication terminal device, even if one information channel is used for telephone communication, automatic recording of a message from a distant subscriber who has issued a new call in another empty information channel and facsimile communication in the G3 mode through an empty information channel can be performed simultaneously. In addition, since the message recording and facsimile communication are all performed automatically in the communication terminal device, the operator is not required during telephone communication.

As described above, according to the communication terminal device (facsimile device) of the particular embodiment shown in FIG. 1, simultaneous communication of image information in the G4 facsimile mode and image information in the G3 facsimile mode through the first and second information channels, simultaneous communication of voice information and image information in the G3 facsimile mode, simultaneous communication of two kinds of voice information, etc., can be realized properly as required in addition to the simultaneous communication of voice information and image information in the G4 facsimile mode via the first and second information channels.

While in the above embodiment the ISDN is presumed as a communication network and a facsimile device is presumed as a communication terminal device for convenience. A communication terminal device according to the present invention is not limited to this communication network or terminal device. A telephone set or a telex may be used as the communication terminal device in addition to the facsimile device. If two CODECs corresponding to the two information channels are provided and appropriate analog switches are disposed among these CODECs and analog sources to switch between these analog sources and the two system CODECs to send and receive signals to and from the corresponding distant subscribers, or between the analog sources to send and receive signals to and from each other, simultaneous communication of two kinds of information in various forms corresponding to the manners in which the analog switch is switched is realized.

What is claimed is:

1. A communication terminal device which is connected to a communication network through communication lines in which at least two information channels used for transfer of switching information such as line switching information or packet switching information and a signal channel used for control of call of a distant communication terminal are disposed, comprising:

one or more analog sources for receiving and outputting the switching information as an analog signal;

a first and a second CODEC disposed in a first and a second information channel, respectively, of the communication lines for encoding and converting switching information, sent from the analog sources to the respective information channels, to corresponding digital signals, and decoding and converting switching information received from the respective information channels to corresponding analog signals; and a first and a second analog switch disposed between the analog sources and the first and second CODECs so as to correspond to the first and second CODECs for switching between the analog sources and the first and second CODECs to send and receive signals to and from the analog sources and the first and second CODECs, or between the analog sources to send and receive signals to and from each other.

2. A communication terminal device according to claim 1, wherein the communication terminal device includes a facsimile device which includes a communication function control unit operative to a G4 facsimile mode, a communication function control unit operative in a G3 facsimile mode as the analog sources and a handset for performing a voice communication; and wherein the second analog switch is switched such that a conductive signal path is established between the second CODEC corresponding to the second information channel and the communication function control unit operative in the G3 facsimile mode when there is an incoming telephone call or an originating telephone call in the first information channel during communication of image information in the G4 facsimile mode, the incoming telephone call or the originating telephone call being a request for receipt or translation of image information in the G3 facsimile mode.

3. A communication terminal device according to claim 2, wherein the facsimile device includes an image memory for storing image information temporarily, and wherein the image information received through the second CODEC and the communication function control unit operative in the G3 facsimile mode is temporarily stored in the image memory when a recording section of the facsimile device is used during communication of the image information in the G4 facsimile mode.

4. A communication terminal device according to claim 1, wherein the communication terminal device includes a facsimile device which includes at least a communication function control unit operative in a G3 facsimile mode and a handset for making a voice communication as analog sources, and wherein the analog switches are switched such that the first analog switch renders conductive the signal path between the handset and the first CODEC corresponding to the first information channel during telephone communication through the handset in the first information channel and that the second analog switch renders conductive the signal path between the second CODEC corresponding to the second information channel and the communication function control unit operative in the G3 facsimile mode when there is an incoming telephone call in the second information channel during the telephone communication, the incoming telephone call being a request for receipt of the image information in the G3 facsimile mode.

5. A communication terminal device according to claim 4, wherein the facsimile device further includes a tone detector as the analog source for detecting an incoming tone requesting the receipt of image information in the G3 facsimile mode; and wherein the second analog switch first renders conductive the signal path between the second CODEC and the tone detector when there is an incoming telephone call in the second information channel and renders conductive the signal path between the second CODEC and the communication function control unit operative in the G3 facsimile mode when an incoming tone requesting the receipt of the image information in the G3 facsimile mode is detected by the tone detector.

6. A communication terminal device according to claim 1, wherein the communication terminal device includes at least a handset as the analog source for making a voice communication; and wherein the analog switches are switched such that the first analog switch renders conductive the signal path between the handset and the first CODEC corresponding to the first information channel during communication through the handset in the first information channel, and that the first analog switch temporarily releases the conduction between the first CODEC and the handset, and the second analog switch renders conductive the signal path between the handset and the second CODEC corresponding to the second information channel when there is an incoming telephone call in the second information channel during the telephone communication, the incoming telephone call being a request for telephone communication with the communication terminal device.

7. A communication terminal device according to claim 6, wherein the device further includes means for generating a holding tone indicating that the telephone communication is held; and wherein the analog switches render conductive the signal path between the holding tone generating means and the first CODEC which has been temporarily released from the conduction with the handset.

8. A communication terminal device according to claim 1, wherein the device includes at least a handset for making a voice communication and an automatic answering telephone function unit for automatically receiving voice information as the analog source; and wherein the analog switches are switched such that the first analog switch renders conductive the signal path between the handset and the first CODEC corresponding to the first information channel during telephone communication through the handset in the first information channel and that the second analog switch renders conductive the signal path between the automatic answering telephone function unit and the second CODEC corresponding to the second information channel when there is an incoming telephone call in the second information channel during the telephone communication, the incoming telephone call being a request for telephone communication with the communication terminal device.

9. A communication terminal device connected to a communication network via communication lines in which at least two information channels used for transfer of switching information such as line switching information or packet switching information and a signal channel used for control of calling an objective communication terminal are disposed, comprising:
- a communication function control unit operative in a G4 facsimile mode;
- a communication function control unit operative in a G3 facsimile mode;
- a handset for making a voice communication;
- a first and a second CODEC disposed in a first and second information channel, respectively, in the communication lines for encoding and converting switching information, sent from the handset or the communication function control unit operative in the G3 facsimile mode to the respective information channels, to digital signals, and decoding and converting the switching information received from the respective information channels to analog signals; and
- an analog switch disposed among the handset and the communication function control unit operative in the G3 facsimile mode and the first and second CODECs and controlled so as to render conductive the signal path between the second CODEC corresponding to the second information channel and the communication function control unit operative in the G3 facsimile mode when there is an incoming telephone call or an originating telephone call in the second information channel during communication of image information in the G4 facsimile mode in the first information channel, the incoming telephone call or originating telephone call being a request for receipt or transmission of image information in the G3 facsimile mode.

10. A communication terminal device connected to a communication network via communication lines in which at least two information channels used for transfer of switching information such as line switching information or packet switching information and a signal channel used for control of calling an objective communication terminal are disposed, comprising:
- a communication function control unit operative in a G4 facsimile mode;
- a communication function control unit operative in a G3 facsimile mode;
- a handset for making a voice communication;
- a first and a second CODEC disposed in a first and second information channel, respectively, in the communication lines for encoding and converting switching information, sent from the handset or the communication function control unit operative in the G3 facsimile mode to the respective information channels, to digital signals, and decoding and converting the switching information received from the respective information channels to analog signals; and
- an analog switch disposed among the handset and the communication function control unit operative in the G3 facsimile mode and the first and second CODECs and controlled so as to render conductive the signal path between the handset and the first CODEC corresponding to the first information channel during communication through the handset in the first information channel, and controlled so as to render conductive the signal path between the second CODEC corresponding to the second information channel and the communication function control unit operative in the G3 facsimile mode while maintaining the conductive state between the first CODEC and the handset when there is an incoming telephone call in the second information channel during telephone communication, the incoming telephone call being a request for receipt of image information in the G3 facsimile mode.

11. A communication terminal device according to claim 10, further including a tone detector for detecting an incoming tone requesting the receipt of image information in the G3 facsimile mode; and
- wherein the analog switch first renders conductive the signal path between the second CODEC and the tone detector when there is an incoming telephone call in the second information channel and renders conductive the signal path between the second CODEC and the communication function control unit operative in the G3 facsimile mode when an incoming tone requesting the receipt of the image information in the G3 facsimile mode is detected by the tone detector.

12. A communication terminal device connected to a communication network via communication lines in which at least two information channels used for transfer of switching information such as line switching information or packet switching information and a signal channel used for control of calling an objective communication terminal are disposed, comprising:
- a communication function control unit operative in a G4 facsimile mode;
- a communication function control unit operative in a G3 facsimile mode;
- a handset for making a voice communication;
- a first and second CODEC disposed in a first and a second information channel, respectively, in the communication lines for encoding and converting switching information, sent from the handset or the communication function control unit operative in the G3 facsimile mode to the respective information channels, to digital signals, and decoding and converting the switching information received from the respective information channels to analog signals; and
- an analog switch disposed among the handset and the communication function control unit operative in the G3 facsimile mode and the first and second CODECs and controlled so as to render conductive the signal path between the handset and the first CODEC corresponding to the first information channel during communication through the handset in the first information channel, and controlled so as to temporarily release the conductive state between the handset and the first CODEC and render conductive the signal path between the handset and the second CODEC corresponding to the second information channel, the communication function control unit being operative in the G3 facsimile mode while maintaining the conductive state between the first CODEC and the handset when there is an incoming telephone call in the second information channel during the telephone communication, the incoming telephone call being a request for telephone communication with the communication terminal device.

13. A communication terminal device according to claim 12, further including means for generating a holding tone indicating that the telephone communication is held; and wherein the analog switches render conductive the signal path between the holding tone generating means and the first CODEC which has been temporarily released from the conduction with the handset.

14. A communication terminal device connected to a communication network via communication lines in which at least two information channels used for transfer of switching information such as line switching information or packet switching information and a signal channel used for control of calling an objective communication terminal are disposed, comprising:

a communication function control unit operative in a G4 facsimile mode;

a communication function control unit operative in a G3 facsimile mode;

a handset for making a voice communication;

an automatic answering telephone function unit;

a first and a second CODEC disposed in a first and second information channel, respectively, in the communication lines for encoding and converting switching information, sent from the handset, the communication function control unit operative in the G3 facsimile mode, or the automatic answering telephone function unit to the respective information channels, to digital signals, and decoding and converting the switching information received from the respective information channels to analog signals; and an analog switch disposed among the handset, the communication function control unit operative in the G3 facsimile mode and the automatic answering telephone function unit, and the first and second CODECs and controlled so as to render conductive the signal path between the handset and the first CODEC corresponding to the first information channel during communication through the handset in the first information channel, and controlled so as to render conductive the signal path between the second CODEC corresponding to the second information channel and the automatic answering function unit while maintaining the conductive state between the first CODEC and the handset when there is an incoming telephone call in the second information channel during the telephone communication, the incoming telephone call being a request for telephone communication with the communication terminal device.

* * * * *